US012422968B2

(12) United States Patent
Akima et al.

(10) Patent No.: US 12,422,968 B2
(45) Date of Patent: Sep. 23, 2025

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Satoshi Akima, Nagakute (JP); Yasuyuki Kamezaki, Toyota (JP); Masato Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 18/512,360

(22) Filed: Nov. 17, 2023

(65) Prior Publication Data
US 2024/0256099 A1 Aug. 1, 2024

(30) Foreign Application Priority Data
Jan. 26, 2023 (JP) .................. 2023-010358

(51) Int. Cl.
*B60K 35/10* (2024.01)
*G06F 3/0481* (2022.01)
*G06Q 30/0601* (2023.01)
*B60K 35/81* (2024.01)

(52) U.S. Cl.
CPC ............ *G06F 3/0481* (2013.01); *B60K 35/10* (2024.01); *G06Q 30/0631* (2013.01); *B60K 35/81* (2024.01)

(58) Field of Classification Search
CPC ....... G06F 3/0481; B60K 35/10; B60K 35/81; G06Q 30/0631
See application file for complete search history.

(56) References Cited

U.S. PATENT DOCUMENTS

| 11,282,305 B2* | 3/2022 | Suzuki | G07C 5/0808 |
| 2022/0289204 A1 | 9/2022 | Manabe | |
| 2024/0007833 A1* | 1/2024 | Kim | H04W 80/12 |
| 2025/0083669 A1* | 3/2025 | Kasuya | B60W 30/0956 |

FOREIGN PATENT DOCUMENTS

JP 2022-138727 A 9/2022

OTHER PUBLICATIONS

Benjamin Willmann et a., Current-based EMF-assessment method for vehicles, Sep. 1, 2019, International Symposium on Electromagnetic Compatibility, pp. 1-5 (Year: 2019).*
Maria Vittoria Corazza et al., Facilitating Bus Fleets Emissions Assessment, Jun. 1, 2020, International Conference on Environment and Electrical Engineering, pp. 1-6 (Year: 2020).*

* cited by examiner

*Primary Examiner* — Tam T Tran
(74) *Attorney, Agent, or Firm* — Oliff PLC

(57) ABSTRACT

In an information processing apparatus, a control unit is configured to execute acquiring assessment results of a plurality of items on driving operation of a first vehicle, and first information on a first device. The first device is used to assist in driving operation of a first item of which the assessment result is lower than a reference value among the plurality of items, and the first device is attachable to the first vehicle. The control unit is configured to output the assessment results of the plurality of items and the first information in a form in which the assessment result of the first item is associated with the first information.

18 Claims, 10 Drawing Sheets

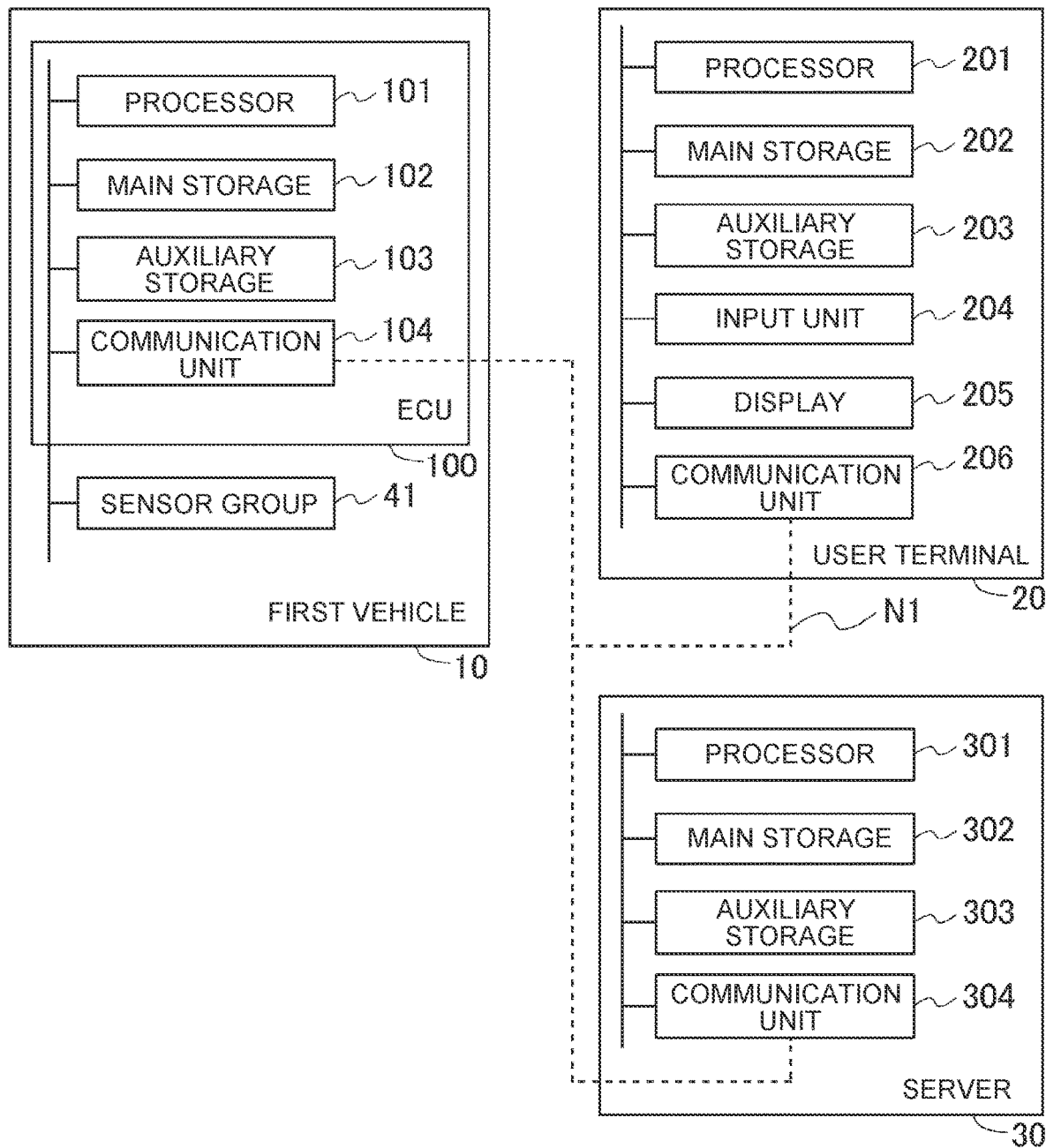
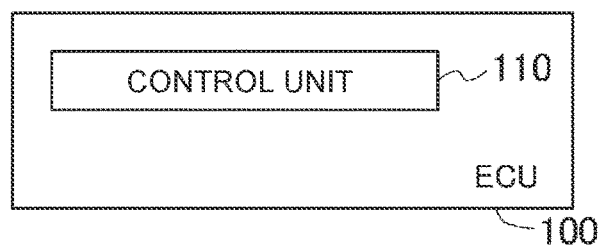

FIG. 4
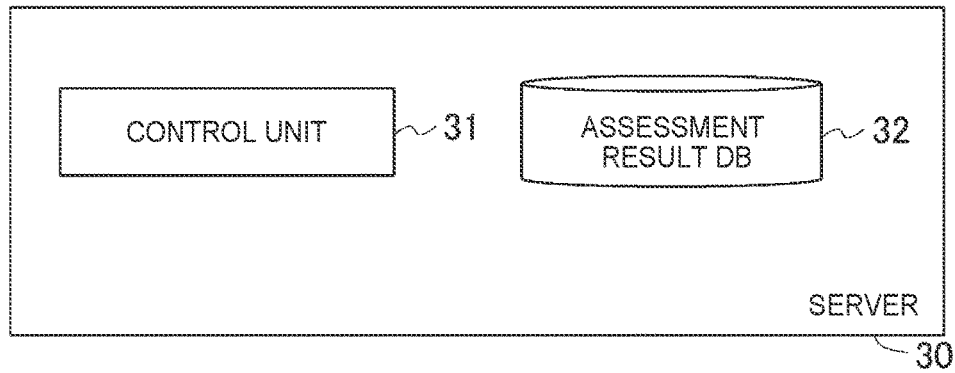
FIG. 5
ASSESSMENT RESULT DB
| VEHICLE ID | USER ID | TRAVEL DISTANCE | TRAVEL DATE AND TIME | ACCELERATOR OPERATION | BRAKE OPERATION | BACKING OPERATION | TURN SIGNAL OPERATION | FIRST INFORMATION | ... |
|---|---|---|---|---|---|---|---|---|---|
| V001 | U0001 | xxx | xxx | xxx | xxx | xxx | xxx | ---- | ... |
| ... | ... | ... | ... | ... | ... | ... | ... | ... | ... |
FIG. 6
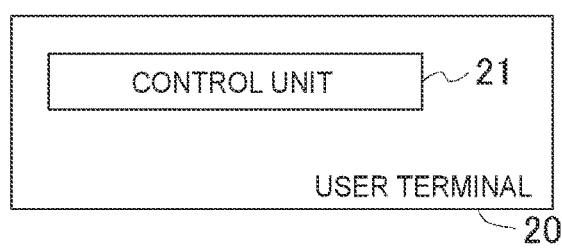

INFORMATION PROCESSING APPARATUS, INFORMATION PROCESSING METHOD, AND NON-TRANSITORY STORAGE MEDIUM

CROSS-REFERENCE TO RELATED APPLICATION

This application claims priority to Japanese Patent Application No. 2023-010358 filed on Jan. 26, 2023, incorporated herein by reference in its entirety.

BACKGROUND

1. Technical Field

The disclosure relates to an information processing apparatus, an information processing method, and a non-transitory storage medium.

2. Description of Related Art

It is known that a physical quantity that changes based on at least one of traveling, steering, and braking of a vehicle or a physical quantity that changes as a result of operation of a predetermined operating member is detected and then the score of driving operation is computed based on the detected value (see, for example, Japanese Unexamined Patent Application Publication No. 2022-138727 (JP 2022-138727 A)).

SUMMARY

The disclosure provides a technology for making it possible to provide further beneficial information for a user on vehicle driving assessment.

A first aspect of the disclosure provides an information processing apparatus. In this case, the information processing apparatus may include, for example, a control unit. The control unit is configured to execute: acquiring assessment results of a plurality of items on driving operation of a first vehicle, and first information on a first device, the first device being used to assist in driving operation of a first item of which the assessment result is lower than a reference value among the plurality of items, the first device being attachable to the first vehicle, and outputting the assessment results of the plurality of items and the first information in a form in which the assessment result of the first item is associated with the first information.

A second aspect of the disclosure provides an information processing method executed by a computer. In this case, the information processing method may include, for example, acquiring assessment results of a plurality of items on driving operation of a first vehicle, and first information on a first device, the first device being used to assist in driving operation of a first item of which the assessment result is lower than a reference value among the plurality of items, the first device being attachable to the first vehicle; and outputting the assessment results of the plurality of items and the first information in a form in which the assessment result of the first item is associated with the first information.

A third aspect of the disclosure provides a non-transitory storage medium storing instructions that are executable on one or more processors and that cause the one or more processors to execute functions. The functions may include acquiring assessment results of a plurality of items on driving operation of a first vehicle, and first information on a first device, the first device being used to assist in driving operation of a first item of which the assessment result is lower than a reference value among the plurality of items, the first device being attachable to the first vehicle, and outputting the assessment results of the plurality of items and the first information in a form in which the assessment result of the first item is associated with the first information.

According to the aspects of the disclosure, it is possible to provide further beneficial information for a user on vehicle driving assessment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a block diagram that shows an example of the hardware components of each of a first vehicle, a user terminal, and a server included in the system according to the embodiment;

FIG. 3 is a block diagram that shows an example of the functional configuration of an ECU according to the embodiment;

FIG. 4 is a block diagram that shows an example of the functional configuration of the server according to the embodiment;

FIG. 5 is a table that shows an example of information stored in an assessment result DB according to the embodiment;

FIG. 6 is a block diagram that shows an example of the functional configuration of the user terminal according to the embodiment;

DETAILED DESCRIPTION OF EMBODIMENTS

Figure 1:
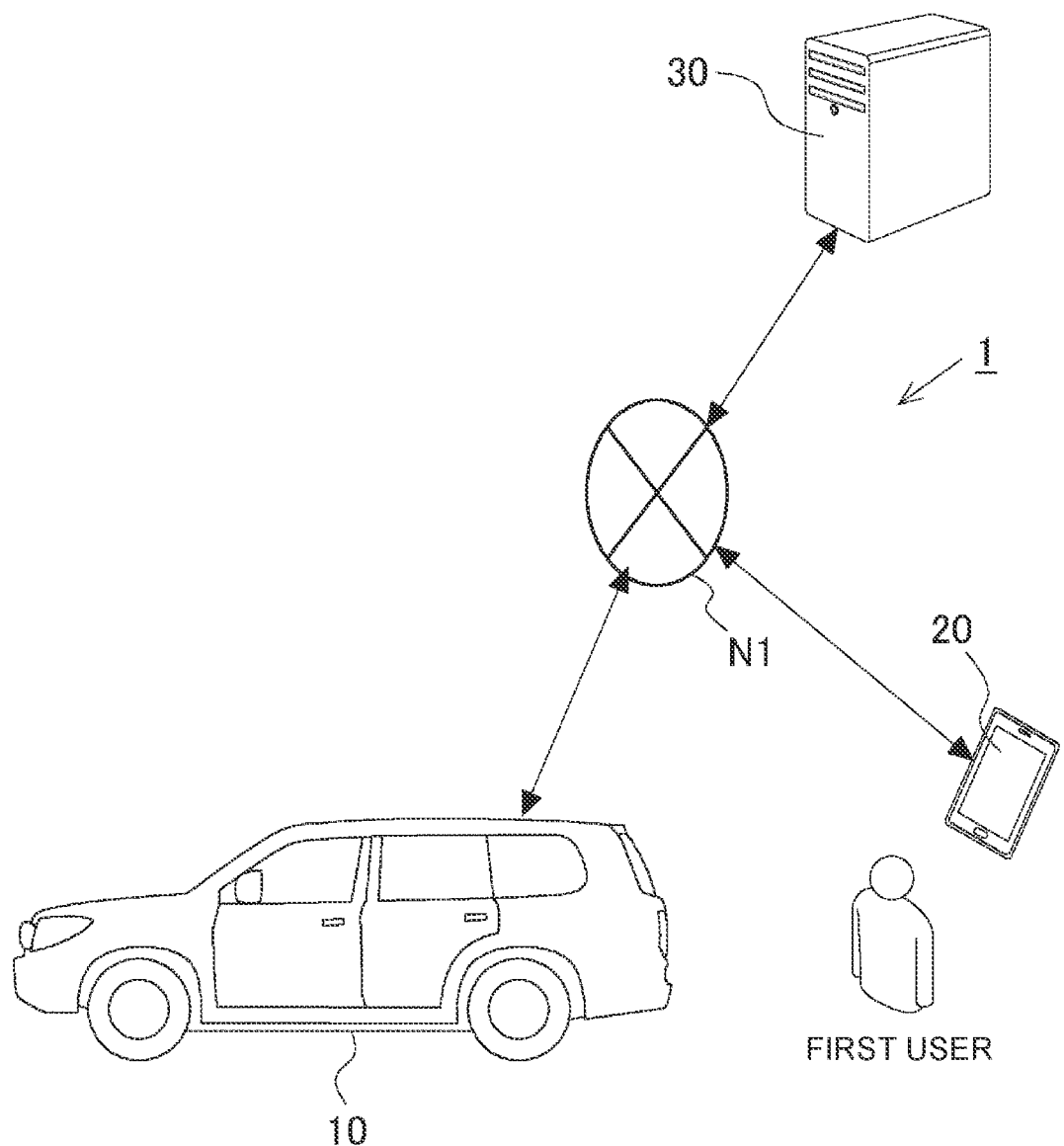
FIG. 1 is a block diagram that shows the schematic configuration of a system according to an embodiment.

There is known a technology to notify a user of assessment results of a plurality of items on driving operation of a vehicle by the user. The user notified of such assessment results is able to objectively understand driving operations of items the user is not good at. Thus, it is possible to stimulate user's motivation to improve the driving operations of the items the user is not good at.

Incidentally, even when it is possible to stimulate user's motivation to improve driving operations of items the user is not good at, it is presumable that it takes time to improve the driving operations of the items or the driving operations of the items are not completely improved.

For these reasons, an information processing apparatus that is one of the aspects of the disclosure is configured to, when the information processing apparatus shows assessment results of a plurality of items to a user, present information on a first device (first information) in a form to be associated with an item of which the assessment result is lower than a reference value (first item). The first device is attachable to a first vehicle that the user uses and is used to assist in driving operation of the first item.

Specifically, in the information processing apparatus according to the aspect of the disclosure, a control unit is configured to execute acquiring assessment results of a plurality of items on driving operation of a first vehicle, and first information on a first device, the first device being used to assist in driving operation of a first item of which the assessment result is lower than a reference value among the plurality of items, the first device being attachable to the first vehicle. The control unit is configured to output the assessment results of the plurality of items and the first information in a form in which the assessment result of the first item is associated with the first information.

In the aspect of the disclosure, the plurality of items subjected to driving assessment include, for example, an accelerator operation, a brake operation, a backing operation (reversing operation), a turn signal operation, and the like. Assessment results of these items include, for example, an evaluation value according to the number of accelerator operations causing sudden acceleration, an evaluation value according to the number of unsmooth brake operations, an evaluation value according to the number of sudden reversing of the vehicle (a period of time from when an operation to change a traveling direction of the vehicle to a reverse direction is performed to when the vehicle starts reversing is shorter than an adequate period of time), and an evaluation value according to the number of driving operations causing short-time turn signal operation (a period of time a direction indicator is blinked is shorter than an adequate period of time). The evaluation value of each item may be set so as to increase as the number of the corresponding driving operations reduces. The first item is an item of which the assessment result is lower than a reference value among the plurality of items as described above. The reference value is, for example, a value that, when the assessment result is lower than the reference value, there is presumably a possibility of inconvenience to vehicles around or leading to a decrease in safety.

The first device according to the aspect of the disclosure is not limited to hardware and can include software. Here, when the item corresponding to the first item is an accelerator operation, the first device is, for example, a device that automatically adjusts the acceleration of the vehicle when the user performs a sudden accelerator operation. When the item corresponding to the first item is a brake operation, the first device is a device that automatically adjusts braking force at the start of brake operation and/or automatically adjusts braking force when the vehicle stops. When the item corresponding to the first item is a backing operation, the first device is, for example, a device that, when the first vehicle reverses, detects a moving object (such as a vehicle and a person) approaching from the right side, the left side, or the rear side and calls attention to a driver (for example, rear cross traffic alert (RCTA)). When the item corresponding to the first item is a turn signal operation, the first device is, for example, a device that detects a moving object located to the right side, the left side, or the rear side of the first vehicle and calls attention to a driver (for example, blind spot monitor (BSM)).

According to the aspect of the disclosure, since the first information is output in a form to be associated with the assessment result of the first item, the user of the first vehicle is able to objectively recognize a driving operation of an item that the user is not good at (an item of which the assessment result is lower than the reference value) and is able to accurately learn the device (first device) that assists in the driving operation of the item. Thus, the user is able to appropriately perform a driving operation of an item the user is not good at by retrofitting the first device to the first vehicle.

The control unit of the information processing apparatus according to the aspect of the disclosure may output a first button that is a GUI component for causing a first screen on a function of the first device to be output, in a form to be put side by side with the assessment result of the first item. Thus, the user of the first vehicle is able to recognize that the first button is a GUI component relevant to the assessment result of the first item. The user of the first vehicle is also able to browse the first screen on the first device by operating the first button. As a result, the user of the first vehicle is able to learn the function of the first device.

The first screen according to the aspect of the disclosure may contain a second button that is a GUI component linked with a site that sells the first device. Thus, when the user desires to attach the first device to the first vehicle, the user is able to purchase the first device by operating the second button.

In the information processing apparatus according to the aspect of the disclosure, when the control unit outputs the assessment results of the plurality of items, the control unit may output information prompting to browse the first item. Thus, it is possible to call motivation to browse the assessment result of the first item and the first information for the user of the first vehicle.

In the information processing apparatus according to the aspect of the disclosure, when the assessment results of the plurality of items are output after the first device is attached to the first vehicle, the control unit may output an assessment result of the first item before the first device is attached and an assessment result of the first item after the first device is attached. Thus, the user who has attached the first device to the first vehicle is able to compare an assessment result before the first device is attached with an assessment result after the first device is attached. In other words, the user is able to learn the effect of attaching the first device. As a result, it is possible to increase user satisfaction rating with attachment of the first device.

In the information processing apparatus according to the aspect of the disclosure, when there is no item corresponding to the first item among the plurality of items, the control unit may output only the assessment results of the plurality of items. Thus, only when there is an item corresponding to the first item among the plurality of items, the first information is output. Hence, it is possible to reduce user's burdensome on the first information.

Here, the information processing apparatus according to the aspect of the disclosure may be, for example, a user terminal or a vehicle mount terminal in which a dedicated application program on driving assessment is installed. The information processing apparatus according to the aspect of the disclosure may be a server that causes a browser of a user terminal or a vehicle mount terminal to display a list of the assessment results of the plurality of items and the first information by running a web server. The assessment results of the plurality of items in the aspect of the disclosure may be created for each predetermined period. In this case, the predetermined period may be one trip, several days, several weeks, several months, a period during which the first vehicle travels a predetermined distance (for example, several tens of kilometers to several hundreds of kilometers), or the like. In the information processing apparatus according to the aspect of the disclosure, when the assessment results of the plurality of items are created, the control unit may notify the user through push notification or the like that the assessment results of the plurality of items are created.

Hereinafter, embodiments of the disclosure will be described with reference to the accompanying drawings. The configurations of the following embodiments are illustrative, and the disclosure is not limited to the configurations of the embodiments. The following embodiments may be combined as long as possible.

Embodiment

FIG. 1 is a diagram that shows the schematic configuration of a system 1 according to the present embodiment. The system 1 is a system for providing a service to assess driving operations of a first vehicle 10 by a first user and provide assessment results to the first user (hereinafter, may also be referred to as driving assessment service).

In the example of FIG. 1, the system 1 includes the first vehicle 10, a user terminal 20, and a server 30. The first vehicle 10 is a vehicle that the first user drives. The user terminal 20 is a terminal that the first user uses. The server 30 makes a driving assessment as to a plurality of items on driving operations of the first vehicle 10 and provides assessment results of the items to the user terminal 20. When there is an item (first item) of which the assessment result is lower than a reference value among the plurality of items, the server 30 according to the present embodiment provides not only the assessment results of the items but also first information to the user terminal 20. The first information is information on a device (first device) used to assist in the driving operation of the first item and attachable to the first vehicle 10. The user terminal 20 presents a list of the assessment results of the items to the user by running a dedicated application program. Then, when there is an item corresponding to the first item among the items, the user terminal 20 also presents information on the first device to the user in a form to be associated with the assessment result of the item corresponding to the first item.

The first vehicle 10, the user terminal 20, and the server 30 are connected to one another by a network N1. The network N1 is a wide area network (WAN) that is a world wide public telecommunication network, such as the Internet, or another communication network. The network N1 may include a telephone communication network for mobile phones or the like and/or a wireless communication network, such as Wi-Fi (registered trademark). The first vehicle 10 may be connected to the user terminal 20 via a near field communication. FIG. 1 illustratively shows one first vehicle 10; however, there can be a plurality of the first vehicles 10. The number of the user terminals 20 can be multiple according to the number of the first vehicles 10.

Hardware Components of System

FIG. 2 is a diagram that shows an example of the hardware components of each of the first vehicle 10, the user terminal 20, and the server 30. In the example shown in FIG. 2, only the hardware components relevant to the driving assessment service are extracted and shown; however, each of the first vehicle 10, the user terminal 20, and the server 30 can include another hardware component.

The first vehicle 10 includes an ECU 100 and a sensor group 41. These component elements are connected to one another by a controller area network (CAN), a local interconnect network (LIN), or an in-vehicle network based on standards, such as FlexRay. These component elements each do not need to be a single module and may be implemented by a combination of in-vehicle devices, such as a car navigation system, onboard communication instruments, or the like.

The ECU 100 is a computer mounted on the first vehicle 10. The ECU 100 includes a processor 101, a main storage 102, an auxiliary storage 103, and a communication unit 104. These are connected to one another by a bus.

The processor 101 is a central processing unit (CPU), a digital signal processor (DSP), or the like. The processor 101 controls the ECU 100 and operates various pieces of information processing. The main storage 102 is configured to include a random access memory (RAM), a read only memory (ROM), and the like. The auxiliary storage 103 is configured to include an erasable programmable ROM (EPROM), a hard disk drive (HDD), a removable medium, or the like. An operating system (OS), various programs, various tables, and the like are stored in the auxiliary storage 103. When the processor 101 loads a program stored in the auxiliary storage 103 onto a work area of the main storage 102 and runs the program, constituent portions and the like are controlled. Thus, a function that matches a predetermined purpose is implemented by the ECU 100. The main storage 102 and the auxiliary storage 103 are computer-readable recording media. Part of information stored in the auxiliary storage 103 may be stored in the main storage 102. Part of information stored in the main storage 102 may be stored in the auxiliary storage 103.

The communication unit 104 is an interface for connecting the ECU 100 with the network N1. The communication unit 104 is a communication circuit for communicating with another device (for example, the server 30 or the like) via the network N1 by using a mobile communication service (for example, a telephone communication network, such as 6th generation (6G), 5th generation (5G), 4th generation (4G), 3rd generation (3G), and long term evolution (LTE)), or a wireless communication network, such as Wi-Fi (registered trademark) and Bluetooth (registered trademark).

The sensor group 41 includes, for example, sensors that detect the status of the first vehicle 10, sensors that detect the operations of a driver, and the like. The sensor group 41 includes, for example, a speed sensor, an acceleration sensor, an accelerator operation amount sensor, a steering angle sensor, a yaw rate sensor, a turn signal switch sensor (a sensor that detects the status of a switch for a direction indicator), a shift position sensor, a location information sensor (GPS sensor), a brake switch, or the like. The sensor group 41 may include a sensor that detects activation of a system, such as precrash safety.

Next, the user terminal 20 is a computer that the first user uses. The user terminal 20 is, for example, a smartphone, a mobile phone, a tablet terminal, a personal information terminal, a wearable computer (such as a smart watch), a personal computer (PC), or the like. The user terminal 20 includes a processor 201, a main storage 202, an auxiliary storage 203, an input unit 204, a display 205, and a communication unit 206. These are connected to one another by a bus. The processor 201, the main storage 202, the auxiliary storage 203, and the communication unit 206 are respectively similar to the processor 101, the main storage 102, the auxiliary storage 103, and the communication unit 104 of the ECU 100, so the description thereof is omitted. However, programs stored in the auxiliary storage 203 of the user terminal 20 include a dedicated application program (hereinafter, may be referred to as first application program) related to the driving assessment service.

The input unit 204 is a device to receive an input operation performed by the user and is configured to include, for example, a touch panel, a mouse, a keyboard, a microphone, a push button, or the like. The display 205 is a device that presents information to the user and is, for example, a liquid crystal display (LCD), an electroluminescence (EL) panel, or the like. The input unit 204 and the display 205 may be configured as one touch panel display.

Next, the server 30 is a computer managed by a provider of the driving assessment service. As shown in FIG. 2, the server 30 includes a processor 301, a main storage 302, an auxiliary storage 303, and a communication unit 304. These are connected to one another by a bus. The processor 301, the main storage 302, and the auxiliary storage 303 are respectively similar to the processor 101, the main storage 102, and the auxiliary storage 103 of the ECU 100, so the description thereof is omitted.

The communication unit 304 of the server 30 is an interface for connecting the server 30 with the network N1. The communication unit 304 is configured to include, for example, a local area network (LAN) interface board or a wireless communication circuit for wireless communication. In the present embodiment, the communication unit 304 communicates with the first vehicle 10 and the user terminal 20 through the network N1.

Functional Configuration of System

The functional configuration of the system 1 according to the present embodiment will be described. Here, the functional configuration of the ECU 100 will be described. FIG. 3 is a block diagram that shows an example of the functional configuration of the ECU 100 according to the present embodiment. As shown in FIG. 3, the ECU 100 according to the present embodiment includes a control unit 110 as its functional component element.

The control unit 110 is implemented by the processor 101 of the ECU 100 running a program stored in the auxiliary storage 103. In the present embodiment, the control unit 110 sends travel information to the server 30 at intervals of a predetermined period through the communication unit 104. The travel information is, for example, information including detected values of the sensor group 41 in a predetermined period, a date and time of the predetermined period, a travel distance of the first vehicle 10 in the predetermined period, information for identifying the first vehicle 10 (vehicle ID), and the like. The predetermined period is, for example, one trip, several days, several weeks, several months, a period during which the first vehicle travels a predetermined distance (for example, several tens of kilometers to several hundreds of kilometers), or the like. In the present embodiment, an example in which the control unit 110 sends travel information every one trip will be described. Here, the term "one trip" may be a period from when the first vehicle 10 is started up (for example, an ignition switch is turned on) to when the first vehicle 10 is stopped (for example, the ignition switch is turned off) or a period from when the first vehicle 10 starts traveling along a route from a departure place to a destination, set in the car navigation system or the like, to when the first vehicle 10 stops traveling.

The functional configuration of the ECU 100 is not limited to the example shown in FIG. 3, and omission, modification, or addition of functional component elements is possible as needed. Any one or some of the functional component elements of the ECU 100 or part of the process of the ECU 100 may be executed by another computer mounted on the first vehicle 10.

Next, the functional configuration of the server 30 will be described. FIG. 4 is a block diagram that shows an example of the functional configuration of the server 30 according to the present embodiment. As shown in FIG. 4, the server 30 according to the present embodiment includes a control unit 31 and an assessment result DB 32 as its functional component elements.

The control unit 31 is implemented by the processor 301 of the server 30 running a program stored in the auxiliary storage 303. The control unit 31 may be implemented by a hardware circuit, such as an application specific integrated circuit (ASIC) and a field programmable gate array (FPGA).

The control unit 31 receives travel information sent from the ECU 100 of the first vehicle 10, through the communication unit 304. The travel information includes, for example, detected values of the sensor group 41 in one trip, a travel distance of the first vehicle 10 in one trip, a travel date and time of one trip, a vehicle ID of the first vehicle 10, and the like. The thus configured travel information is sent from the ECU 100 to the server 30 each time the first vehicle 10 travels one trip.

The control unit 31 makes a driving assessment as to the driving operations of the first vehicle 10 by the first user each time the control unit 31 receives travel information sent from the first vehicle 10. A driving assessment is made as to predetermined items one by one. In the present embodiment, the control unit 31 makes a driving assessment as to the items such as an accelerator operation, a brake operation, a backing operation, and a turn signal operation.

As for the accelerator operation, the control unit 31, for example, makes a driving assessment based on the number of accelerator operations causing sudden acceleration in one trip. Then, the control unit 31 may make a driving assessment such that an evaluation value increases as the number of accelerator operations causing sudden acceleration reduces.

As for the brake operation, the control unit 31, for example, makes a driving assessment based on the number of unsmooth brake operations in one trip. Then, the control unit 31 may make a driving assessment such that an evaluation value increases as the number of unsmooth brake operations reduces. Here, the term "unsmooth brake operation" is a brake operation such that pitching of a vehicle body is excessive when the brake operation is started and/or when the first vehicle 10 is stopped.

For the backing operation, the control unit 31, for example, makes a driving assessment based on the number of operations to suddenly reverse the first vehicle 10 in one trip. Then, the control unit 31 may make a driving assessment such that an evaluation value increases as the number of times of sudden reversing reduces. Here, the term "sudden reversing" is, for example, a driving operation of which a period of time from when the shift position is operated to reverse to when the first vehicle 10 actually starts reversing is shorter than an adequate period of time.

For the turn signal operation, the control unit 31 makes a driving assessment based on the number of turn signal operations causing a short-time turn signal operation in one trip. Then, the control unit 31 may make a driving assessment such that an evaluation value increases as the number of turn signal operations causing a short-time turn signal operation reduces. Here, the term "short-time turn signal operation" is a driving operation such that a turn signal active time (a period of time to blink a direction indicator) is shorter than an adequate period of time.

The evaluation value of each of the items may be the number of rating stars, rank, or score. In the present embodiment, it is assumed that the number of rating stars ranging from one to five is used as the above-described evaluation value. Then, it is assumed that, as evaluation of driving assessment increases, the number of rating stars increases.

When a driving assessment as to the items is complete, the control unit 31 enters the assessment results of the items in the assessment result DB 32. Then, when there is an item (corresponding to the first item) of which the evaluation value is lower than the reference value among the items, the control unit 31 enters the first information in the assessment result DB 32 in a form to be associated with the assessment result. Here, the term "reference value" is, for example, a value that, when the assessment result is lower than the reference value, there is presumably a possibility of inconvenience to vehicles around or leading to a decrease in safety. In the present embodiment, it is assumed that three stars are used as the reference value. Here, the term "first information" is information on a device (first device) used to assist in the driving operation of the item corresponding to the first item and attachable to the first vehicle 10. In the present embodiment, the first information includes information on the function of the first device, a link (for example, uniform resource locator (URL)) to a site that sells the first device, and the like.

Here, when the item corresponding to the first item is an accelerator operation, the first device is a device that automatically adjusts the acceleration of the first vehicle 10 when, for example, a sudden accelerator operation is performed. When the item corresponding to the first item is a brake operation, the first device is a device that automatically adjusts braking force at the start of brake operation and/or automatically adjusts braking force when the vehicle stops. When the item corresponding to the first item is a backing operation, the first device is, for example, a device (for example, RCTA) that, when the first vehicle reverses, detects a moving object (such as a vehicle and a person) approaching from the right side, the left side, or the rear side and calls attention to a driver. When the item corresponding to the first item is a turn signal operation, the first device is, for example, a device (for example, BSM) that detects a moving object located to the right side, the left side, or the rear side of the vehicle and calls attention to a driver.

When the control unit 31 finishes entering the assessment results of the items (and the first information) into the assessment result DB 32, the control unit 31 sends a first signal to the user terminal 20 through the communication unit 304. The first signal is a signal including a command to provide push notification to the first user through the first application program installed in the user terminal 20. The push notification is a notification for informing the first user that the driving assessment by the server 30 is complete. The first signal may be an SMS or an e-mail for informing the first user that the driving assessment by the server 30 is complete.

After the first signal is sent from the server 30 to the user terminal 20, when the communication unit 304 of the server 30 receives a first request sent from the user terminal 20, the control unit 31 sends a second signal to the user terminal 20 through the communication unit 304. The first request is a signal for making a request for assessment results of driving assessment from the server 30 and includes a vehicle ID of the first vehicle 10 and a user ID of the first user. In the server 30 having received the first request, the control unit 31 accesses the assessment result DB 32 (described later) by using the vehicle ID and the user ID, included in the first request, as arguments and extracts the corresponding assessment results. Then, when there is an item corresponding to the first item, not only the corresponding assessment results but also the first information is extracted. The control unit 31 sends a second signal including the extracted information to the user terminal 20 through the communication unit 304.

The assessment result DB 32 of the server 30 is a database constructed in the auxiliary storage 303 of the server 30 by the processor 301 running a program of database management system (DBMS). The assessment result DB 32 may be constructed as a relational database.

The assessment result DB 32 stores assessment results generated by the control unit 31 vehicle by vehicle. FIG. 5 is a table that shows an example of information stored in the assessment result DB 32 according to the present embodiment. As shown in FIG. 5, the assessment result DB 32 according to the present embodiment has records (hereinafter, may be referred to as assessment result records) vehicle by vehicle. As shown in FIG. 5, each assessment result record has fields of vehicle ID, user ID, travel distance, travel date and time, accelerator operation, brake operation, backing operation, turn signal operation, first information, and the like.

Information (vehicle ID) for identifying each of the first vehicles 10 subjected to the driving assessment service is entered in the vehicle ID field of the assessment result record. Identification information (user ID) of the first user who drives a corresponding one of the first vehicles 10 is entered in the user ID field. Information entered in the user ID field includes information for identifying the user terminal 20 that a corresponding one of the first users uses. A distance that a corresponding one of the first vehicles 10 has travelled in a trip subjected to assessment is entered in the travel distance field. A date and time at which a corresponding one of the first vehicles 10 has travelled a trip subjected to assessment is entered in the travel date and time field. An assessment result of an accelerator operation in a trip subjected to assessment is entered in the accelerator operation field. An assessment result of a brake operation in a trip subjected to assessment is entered in the brake operation field. An assessment result of a backing operation in a trip subjected to assessment is entered in the backing operation field. An assessment result of a turn signal operation in a trip subjected to assessment is entered in the turn signal operation field. In the present embodiment, information indicating the number of rating stars according to an assessment result is entered in each of the accelerator operation field, the brake operation field, the backing operation field, and the turn signal operation field. First information for an item corresponding to the first item is entered in the first information field. As described above, the first information includes information on the function of the first device, a link to a site that sells the first device, and the like. Information on the function of the first device is, for example, information including at least one of text information describing the function of the first device, a figure illustrating the function of the first device, and a moving image illustrating the function of the first device. When there is no item corresponding to the first item (no item of which the assessment result is lower than the reference value (for example, the number of rating stars is smaller than three)) among the items of accelerator operation, brake operation, backing operation, and turn signal operation, information indicating that "Not Applicable" (for example, "N/A") is entered.

The assessment result record of the assessment result DB 32 is generated each time the control unit 21 makes a driving assessment and is entered in the assessment result DB 32. The configuration of the assessment result record is not limited to the example shown in FIG. 5, and addition, modification, and deletion of fields are possible as needed. For example, the assessment result record may have a field for entering an assessment result on a driving operation other than the accelerator operation, the brake operation, backing operation, or the turn signal operation.

The functional configuration of the server 30 is not limited to the example shown in FIG. 4, omission, modification, or addition of functional component elements is possible as needed. Any one or some of the functional component elements of the server 30 or part of the process of the server 30 may be executed by another computer connected to the network N1. For example, the process executed by the control unit 31 may be distributed among a plurality of computers and executed.

Next, the functional configuration of the user terminal 20 will be described. FIG. 6 is a block diagram that shows an example of the functional configuration of the user terminal 20 according to the present embodiment. As shown in FIG. 6, the user terminal 20 according to the present embodiment includes a control unit 21 as its functional component element.

The control unit 21 is implemented by the processor 201 of the user terminal 20 running a first application program stored in the auxiliary storage 203. The control unit 21 may be implemented by a hardware circuit, such as an application specific integrated circuit (ASIC) and a field programmable gate array (FPGA).

Figure 7:
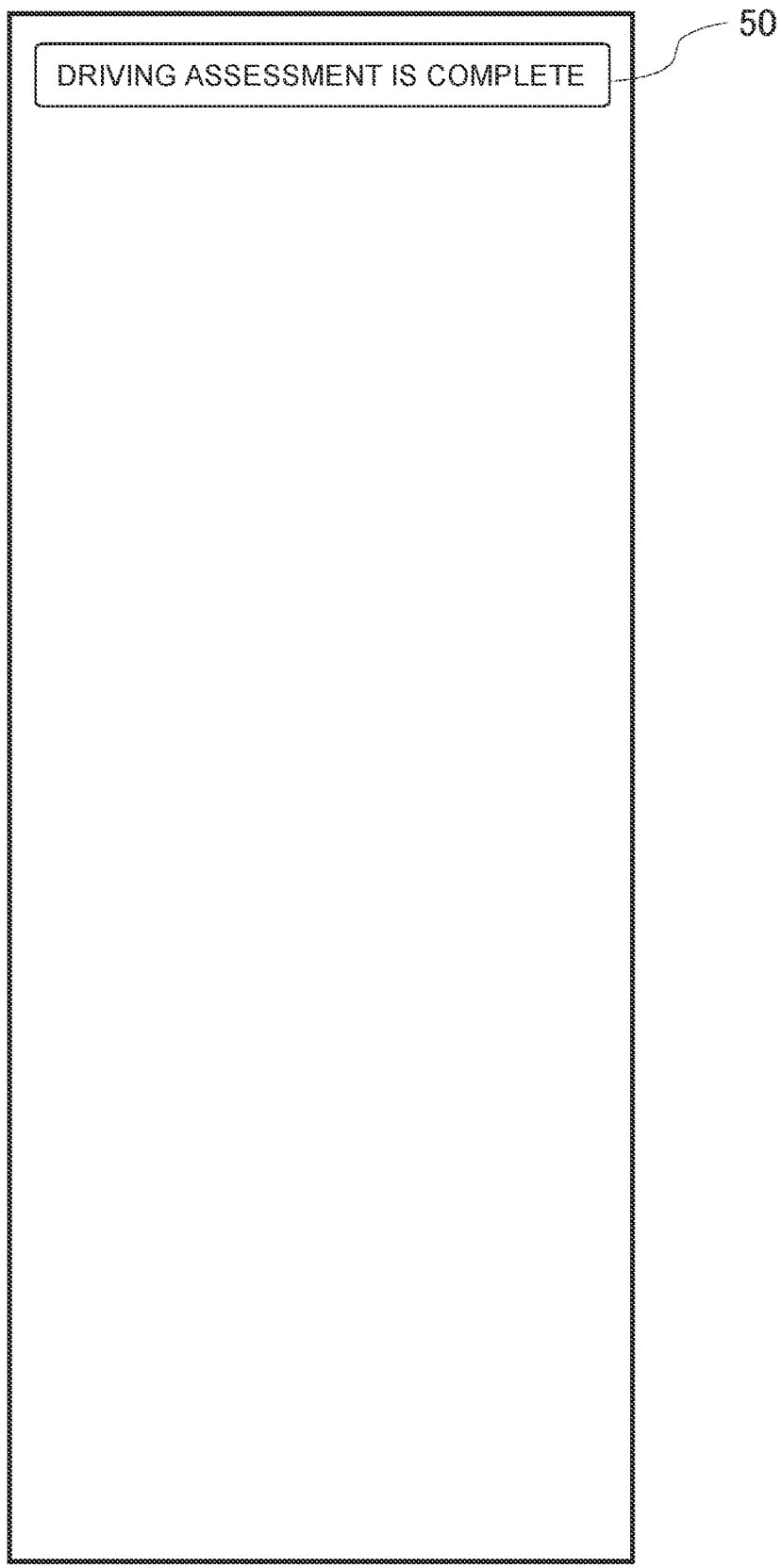
FIG. 7 is a view that shows an example of a first screen according to the embodiment.

The control unit 21 provides push notification to the user on condition that the communication unit 206 receives a first signal sent from the server 30. Push notification according to the present embodiment is a notification for informing the first user that the driving assessment by the server 30 is complete. Specifically, the control unit 21 causes the display 205 to show a GUI component indicating that the driving assessment by the server 30 is complete. FIG. 7 is a view that shows an example of a screen (first screen) on which push notification is shown. As shown in FIG. 7, the first screen contains a display field (indicated by 50 in FIG. 7) for text information indicating that the driving assessment is complete.

In the first screen shown in FIG. 7, when the display field (indicated by 50 in FIG. 7) for text information indicating that the driving assessment is complete is tapped by the user, the control unit 21 sends a first request to the server 30 through the communication unit 206. The first request is a signal for making a request for the assessment results of the driving assessment made by the server 30 and includes the vehicle ID of the first vehicle 10 and the user ID of the first user. When the communication unit 206 of the user terminal 20 receives a second signal sent from the server 30 in response to the first request, the control unit 21 generates an assessment report and causes the display 205 to display the assessment report generated.

Figure 8:
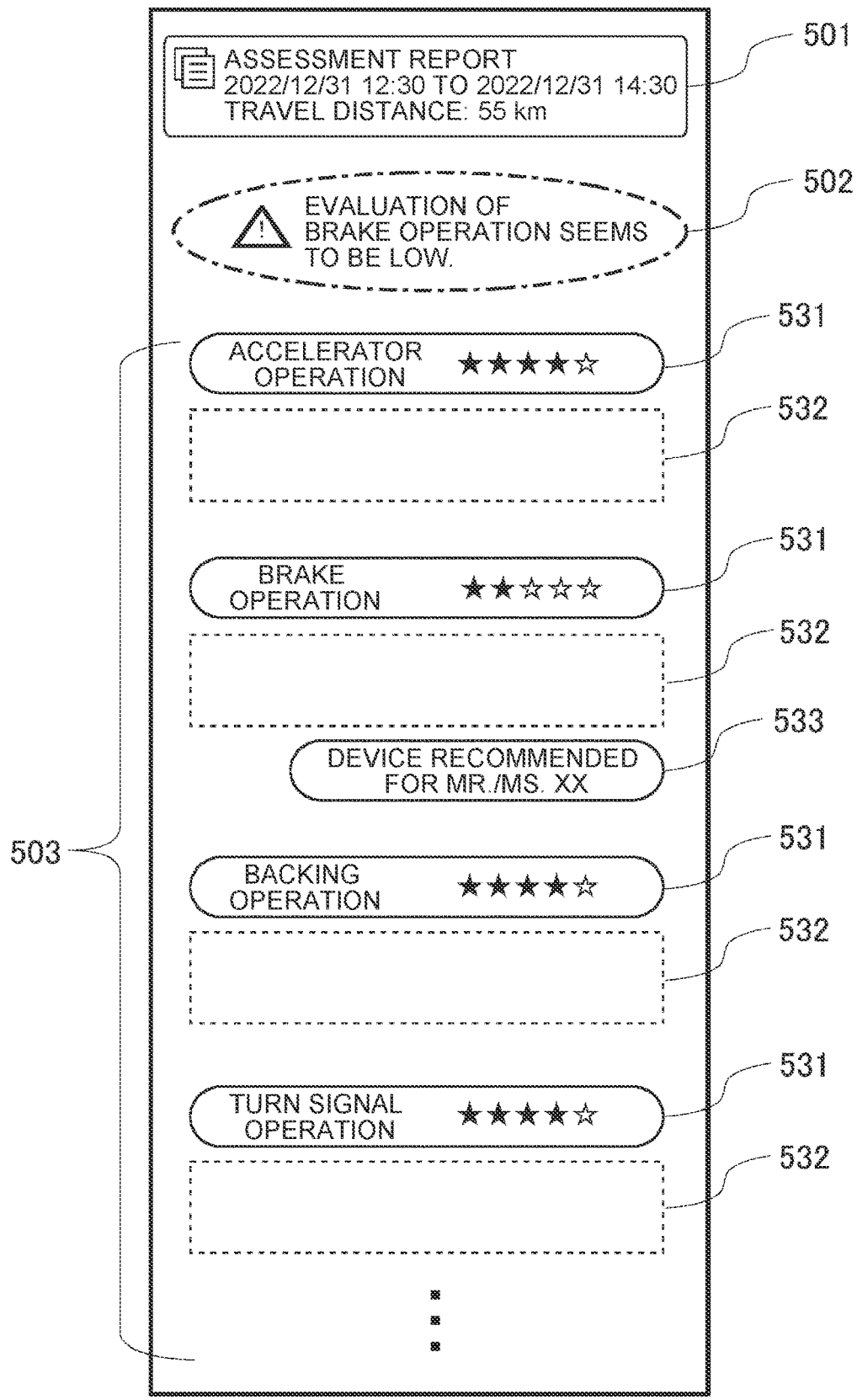
FIG. 8 is a view that shows an example of a second screen according to the embodiment.

Here, a display example of the assessment report will be described. FIG. 8 is a view that shows an example of a display screen (hereinafter, may be referred to as second screen) of an assessment report in a case where there is an item corresponding to the first item among the items subjected to driving assessment. When there is an item corresponding to the first item among the items subjected to driving assessment, the control unit 21 causes the display 205 of the user terminal 20 to display a screen containing a display field (indicated by 501 in FIG. 8) for text information indicating a travel date and time and a travel distance in a trip subjected to assessment, a display field (indicated by 502 in FIG. 8) for text information prompting to browse the assessment result of the item corresponding to the first item, and a display field (indicated by 503 in FIG. 8) for a list of the assessment results of the items. The display field (indicated by 502 in FIG. 8) for text information prompting to browse the assessment result of the item corresponding to the first item is disposed at an attractive position around the top of the second screen as shown in FIG. 8.

The display field (indicated by 503 in FIG. 8) for a list of the assessment results of the items contains a display field (the number of rating stars (indicated by 531 in FIG. 8) indicating the assessment result of each item, descriptive text (indicated by 532 in FIG. 8) for the assessment result, and the like). For the item corresponding to the first item (in the example shown in FIG. 8, the item of brake operation) among the assessment results of the items, a first button (indicated by 533 in FIG. 8) is shown in a form to be put side by side with the display fields (indicated by 531 and 532 in FIG. 8) indicating the assessment result of the item. The first button is a GUI component for showing information on the function of the first device.

FIG. 8 illustrates an assessment report in a case where the item corresponding to the first item is a brake operation. When the item corresponding to the first item is an operation other than the brake operation, the first button is shown in a form to be put side by side with the display field indicating the assessment result of the corresponding item. When, for example, the item corresponding to the first item is an accelerator operation, the first button is shown in a form to be put side by side with the display field indicating the assessment result of the accelerator operation. When the item corresponding to the first item is a backing operation, the first button is shown in a form to be put side by side with the display field indicating the assessment result of the backing operation. When the item corresponding to the first item is a turn signal operation, the first button is shown in a form to be put side by side with the display field indicating the assessment result of the turn signal operation. When there is a plurality of items corresponding to the first item, the first button is shown in a form to be put side by side with the display field indicating an assessment result for each of the items.

The second screen as illustrated in FIG. 8 is generated by the control unit 21 based on information included in the second signal (the assessment results of the items and the first information). For example, the control unit 1 generates the display field (indicated by 502 in FIG. 8) indicating text information prompting to browse the assessment result of the item corresponding to the first item based on the assessment results of the items. More specifically, the control unit 21 identifies the item of which the assessment result (the number of rating stars) is lower than the reference value (for example, three stars) as the first item among the items subjected to assessment. The control unit 21 generates text information prompting to browse the assessment result of the item based on the item identified. Text information prompting to browse an assessment result may be stored in advance item by item in the auxiliary storage 203 of the user terminal 20. The control unit 21 generates the display field (indicated by 503 in FIG. 8) for a list of the assessment results of the items based on the assessment results of the items and the item identified (the item corresponding to the first item).

Figure 9:
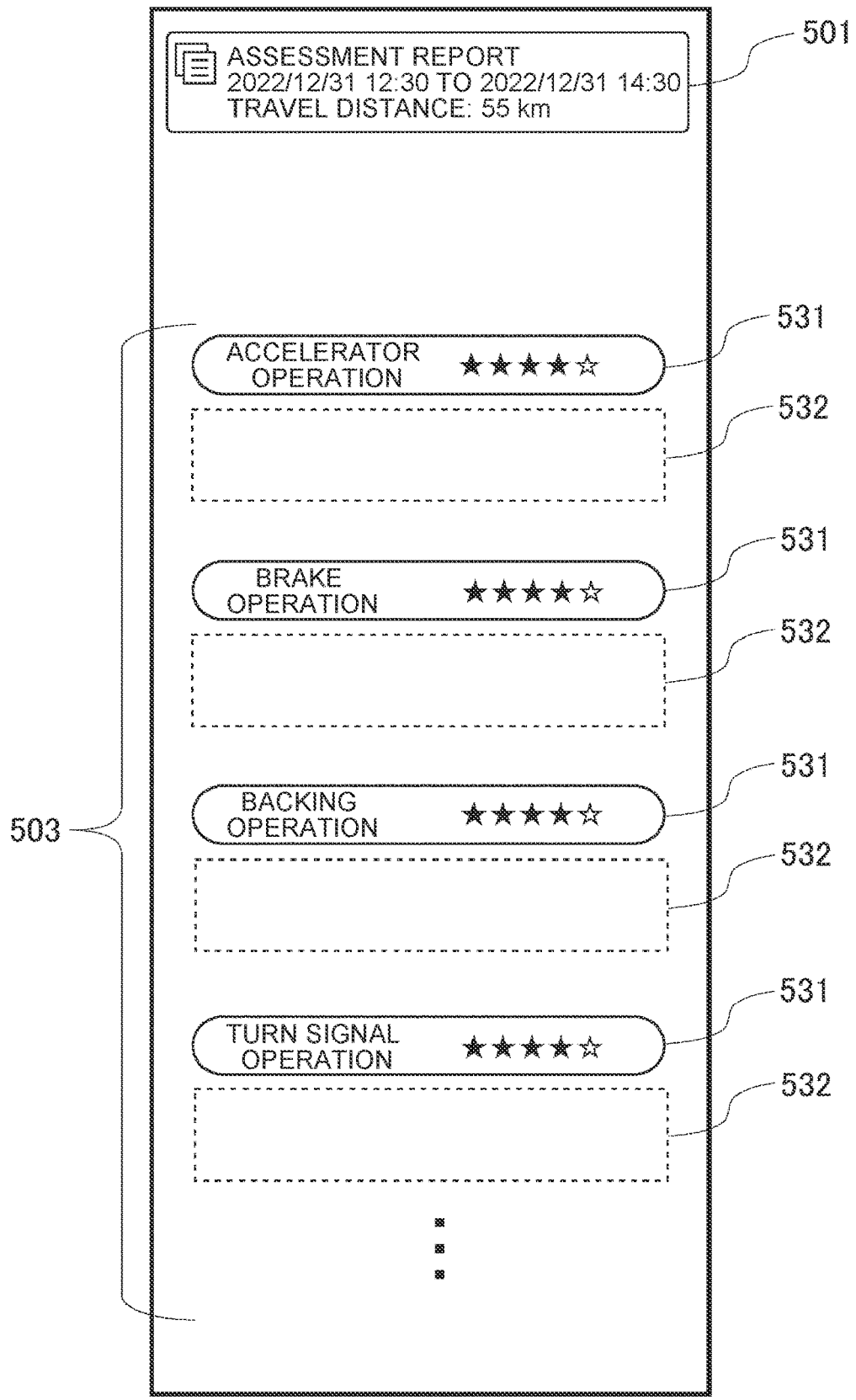
FIG. 9 is a view that shows an example of a third screen according to the embodiment.

FIG. 9 is a view that shows an example of a display screen (hereinafter, may be referred to as third screen) of an assessment report in a case where there is no item corresponding to the first item among the items subjected to driving assessment. When there is no item corresponding to the first item among the items subjected to assessment, the control unit 21 causes the display 205 of the user terminal 20 to display a third screen containing a display field (indicated by 501 in FIG. 9) for text information indicating a travel date and time and a travel distance in a trip subjected to assessment, and a display field (indicated by 503 in FIG. 9) for a list of the assessment results of the items. Then, the first button (corresponding to 533 in FIG. 8) is not displayed in the display field (indicated by 503 in FIG. 9) for a list of the assessment results of the items. In other words, when there is no item corresponding to the first item among the items subjected to assessment, the control unit 21 displays a screen not containing the display field (corresponding to 502 in FIG. 8) for text information prompting to browse the assessment result of the item corresponding to the first item or the first button (corresponding to 533 in FIG. 8).

Figure 10:
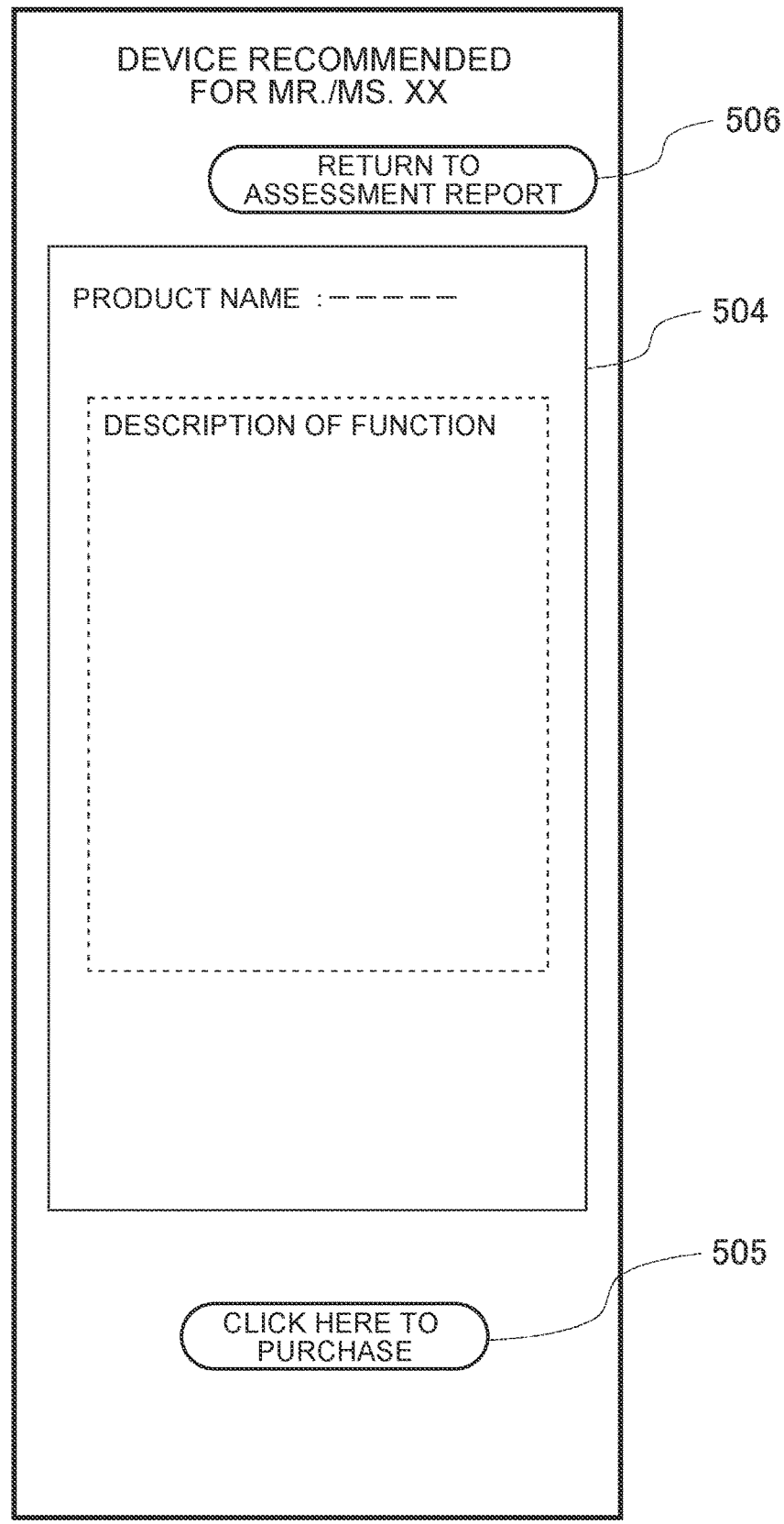
FIG. 10 is a view that shows an example of a fourth screen according to the embodiment.

When an operation to depress the first button is input to the input unit 204 of the user terminal 20 on the second screen as illustrated in FIG. 8, the control unit 21 according to the present embodiment causes the display 205 to show a screen (hereinafter, may be referred to as fourth screen) for illustrating the function of the first device. FIG. 10 is a view that shows a display example of the fourth screen. In the example shown in FIG. 10, the fourth screen contains a display field (indicated by 504 in FIG. 10) for illustrating the function of the first device, a second button (indicated by 505 in FIG. 10), and a third button (indicated by 506 in FIG. 10). The display field (indicated by 504 in FIG. 10) for illustrating the function of the first device contains, for example, a commercial product name of the first device, information for illustrating the function of the first device (for example, text information, figure, a moving image, and/or the like), and the like. The second button (indicated by 505 in FIG. 10) is a GUI component for showing a site that sells the first device. When an operation to depress the second button is input to the input unit 204 of the user terminal 20, the control unit 21 launches a browser and causes the browser to show a site indicated by URL included in the first information (a site that sells the first device). The third button (indicated by 506 in FIG. 10) is a GUI component for switching the screen shown on the display 205 from the fourth screen to the second screen. The fourth screen illustrated in FIG. 10 is generated based on information included in the first information (information on the function of the first device and the link to a site that sells the first device). The fourth screen shown in FIG. 10 may be regarded as the first screen according to the aspect of the disclosure.

Figure 11:
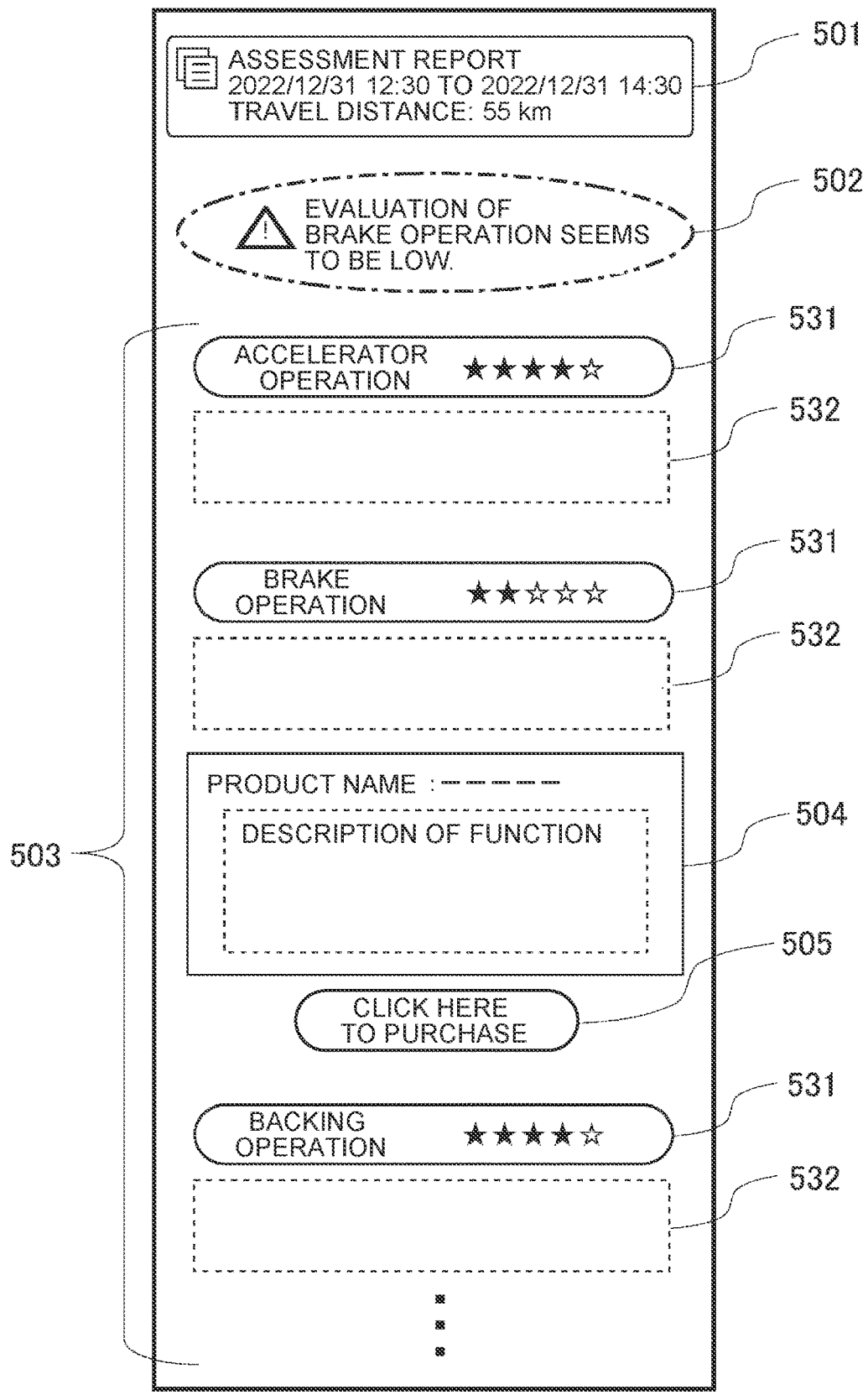
FIG. 11 is a view that shows another example of the second screen according to the embodiment.

When the user terminal 20 displays the second screen, the user terminal 20 may show a display field (indicated by 504 in FIG. 11) for illustrating the function of the first device instead of the first button and the second button (indicated by 505 in FIG. 11) in a form to be put side by side with the assessment result of the item corresponding to the first item as shown in FIG. 11. In this case, the first user is able to understand the details of the first device that can assist in the driving operation of the item corresponding to the first item by just seeing the assessment report on the second screen.

Sending the first request and displaying the second screen or the third screen may be performed on condition that the user inputs an operation to launch the first application program, to the user terminal 20.

The functional configuration of the user terminal 20 is not limited to the example shown in FIG. 6, omission, modification, or addition of functional component elements is possible as needed. Any one or some of the functional component elements of the user terminal 20 or part of the process of the user terminal 20 may be executed by another computer connected to the network N1. For example, at least one of generating the second screen, generating the third screen, and generating the fourth screen may be performed by the server 30. In this case, a second signal including data of a screen generated by the server 30 just needs to be sent from the server 30 to the user terminal 20.

In the present embodiment, the user terminal 20 may be regarded as the information processing apparatus according to the aspect of the disclosure. In this case, the processor 201 of the user terminal 20 may be regarded as the control unit according to the aspect of the disclosure. The user terminal 20 according to the present embodiment may also be regarded as the computer that executes the information processing method according to the aspect of the disclosure. The first application program according to the present embodiment may be regarded as the instructions stored in the non-transitory storage medium according to the aspect of the disclosure.

Flow of Process

Figure 12:
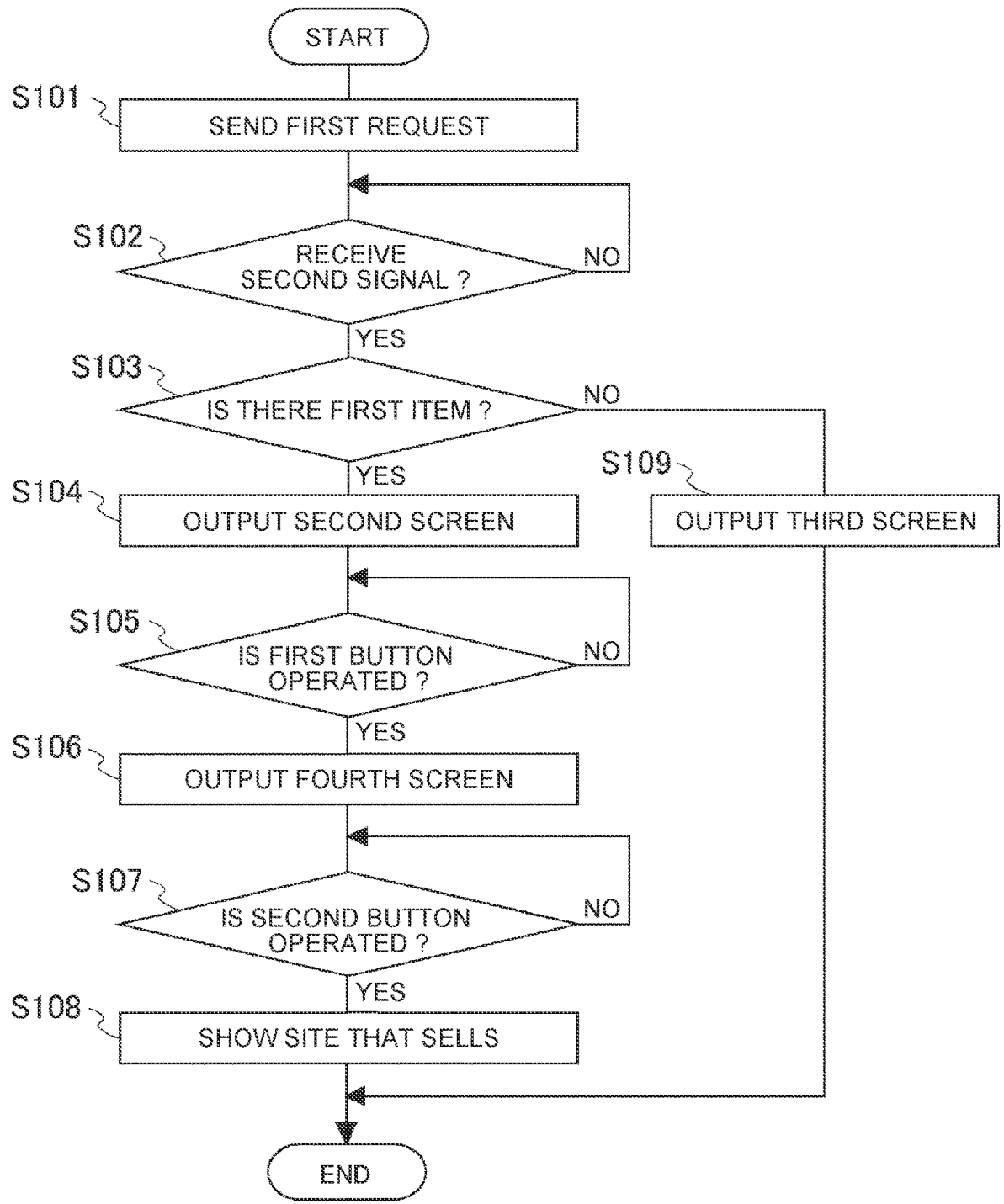
FIG. 12 is a flowchart that shows an example of a process routine that is executed by the user terminal according to the embodiment.

Next, the flow of process that is executed by the user terminal 20 will be described with reference to FIG. 12. FIG. 12 is a flowchart that shows a process routine that is executed by the user terminal 20 on condition that the display field (indicated by 50 in FIG. 7) for text information indicating that the driving assessment is complete is tapped on the first screen (see FIG. 7) or an operation to launch the first application program is input. An entity to execute the process routine shown in FIG. 12 is the processor 201 of the user terminal 20; however, the description will be made on the assumption that the functional component element of the user terminal 20 is an entity to execute the process routine here.

In FIG. 12, when the display field (indicated by 50 in FIG. 7) for text information indicating that the driving assessment is complete is tapped on the first screen (see FIG. 7) or an operation to launch the first application program is input, the control unit 21 of the user terminal 20 sends the first request to the server 30 through the communication unit 206 (step S101). When the control unit 21 finishes execution of the process of step S101, the control unit 21 executes the process of step S102.

In step S102, the control unit 21 determines whether the communication unit 206 has received the second signal sent from the server 30. As described above, the second signal is a signal including the assessment results of the items on the driving operations of the first vehicle 10 by the first user. When there is an item corresponding to the first item (the item of which the assessment result is lower than the reference value) among the items subjected to assessment, not only the assessment results of the items but also the first information is included in the second signal. When the communication unit 206 has not received the second signal (negative determination in step S102), the control unit 21 waits until the communication unit 206 receives the second signal. On the other hand, when the communication unit 206 has received the second signal (affirmative determination in step S102), the control unit 21 executes the process of step S103.

In step S103, the control unit 21 determines whether there is an item (first item) of which the assessment result (the number of rating stars) is lower than the reference value (three stars) based on the assessment results of the items included in the second signal. When there is an item of which the assessment result is lower than the reference value, the control unit 21 determines that there is an item corresponding to the first item (affirmative determination in step S103). On the other hand, when there is no item of which the assessment result is lower than the reference value, the control unit 21 determines that there is no item corresponding to the first item (negative determination in step S103). The control unit 21 may determine that there is an item corresponding to the first item (affirmative determination in step S103) when the first information is included in the second signal and may determine that there is no item corresponding to the first item (negative determination in step S103) when the first information is not included in the second signal.

When the determination is affirmative in step S103, the control unit 21 executes the process of step S104. In step S104, the control unit 21 causes the display 205 of the user terminal 20 to show the second screen. As described with reference to FIG. 8, the second screen is a screen containing the display field (indicated by 501 in FIG. 8) for text information indicating a travel date and time and a travel distance in a trip subjected to assessment, the display field (indicated by 502 in FIG. 8) for text information prompting to browse the assessment result of the item corresponding to the first item, and the display field (indicated by 503 in FIG. 8) for a list of the assessment results of the items. For the item corresponding to the first item (in the example shown in FIG. 8, the item of brake operation) in the display field (indicated by 503 in FIG. 8) for a list of the assessment results of the items, the first button (indicated by 533 in FIG. 8) is also shown in a form to be put side by side with the display fields (indicated by 531 and 532 in FIG. 8) indicating the assessment result of the item. The first button is a GUI component for showing information on the function of the first device. When the control unit 21 finishes execution of the process of step S104, the control unit 21 executes the process of step S105.

In step S105, the control unit 21 determines whether an operation to depress the first button shown on the second screen is input to the input unit 204. When no operation to depress the first button is input to the input unit 204 (negative determination in step S105), the control unit 21 waits until an operation to depress the first button is input to the input unit 204. When an operation to exit from the first application program is input to the input unit 204 before an operation to depress the first button is input to the input unit 204, the control unit 21 may end execution of the process routine. When an operation to depress the first button is input to the input unit 204 (affirmative determination in step S105), the control unit 21 executes the process of step S106.

In step S106, the control unit 21 causes the display 205 of the user terminal 20 to show the fourth screen. In other words, the control unit 21 switches the display screen of the display 205 from the second screen to the fourth screen. The fourth screen is a screen for illustrating the function of the first device as described with reference to FIG. 10. The fourth screen contains the display field (indicated by 504 in FIG. 10) for illustrating the function of the first device, the second button (indicated by 505 in FIG. 10), and the third button (indicated by 506 in FIG. 10). The display field (indicated by 504 in FIG. 10) for illustrating the function of the first device contains, for example, a commercial product name of the first device, information for illustrating the function of the first device (for example, text information, figure, a moving image, and/or the like), and the like. The second button (indicated by 505 in FIG. 10) is a GUI component for showing a site that sells the first device. The third button (indicated by 506 in FIG. 10) is a GUI component for switching the screen shown on the display 205 from the fourth screen to the second screen. When the control unit 21 finishes execution of the process of step S106, the control unit 21 executes the process of step S107.

In step S107, the control unit 21 determines whether an operation to depress the second button shown on the fourth screen is input to the input unit 204. When no operation to depress the second button is input to the input unit 204 (negative determination in step S107), the control unit 21 waits until an operation to depress the second button is input to the input unit 204. When an operation to exit from the first application program is input to the input unit 204 before an operation to depress the second button is input to the input unit 204, the control unit 21 may end execution of the process routine. When an operation to depress the third button is input to the input unit 204 before an operation to depress the second button is input to the input unit 204, the control unit 21 may execute the process of step S104 and the following processes again. When an operation to exit from the first application program is input to the input unit 204, the control unit 21 may end execution of the process routine. When an operation to depress the second button is input to the input unit 204 (affirmative determination in step S107), the control unit 21 executes the process of step S108.

In step S108, the control unit 21 causes the display 205 to show a site that sells the first device. Specifically, the control unit 21 hands the URL included in the second signal (the URL of the site that sells the first device) to the browser by launching the browser of the user terminal 20. Thus, the site that sells the first device is shown on the display 205 through the browser of the user terminal 20.

When the control unit 21 finishes execution of the process of step S108, the control unit 21 ends execution of the process routine.

Operation and Advantageous Effects of Embodiment

In the present embodiment, when there is an item (corresponding to the first item) of which the assessment result is lower than the reference value among the items subjected to driving assessment, the user terminal 20 shows an assessment report (second screen) in a form in which the first button is put side by side with the assessment result of the item corresponding to the first item. Thus, the first user is able to recognize that the first button is a GUI component relevant to the first item. When the first user operates the first button, the user terminal 20 outputs a screen (fourth screen) illustrating the function of the first device. Thus, it is possible to accurately understand the function of the first device used to assist in the driving operation of the first item and attachable to the first vehicle 10. In other words, the first user is able to further accurately recognize that there is the first device that can assist in the driving operation of an item that the first user is not good at and the function of the first device.

In the present embodiment, the user terminal 20 shows the second button linked with a site that sells the first device when the user terminal 20 shows a screen for illustrating the function of the first device (fourth screen). Thus, when the first user desires to attach the first device to the first vehicle 10, the first user is able to purchase the first device without taking effort to investigate, for example, a method of purchasing the first device.

In the present embodiment, when there is an item corresponding to the first item among the items subjected to driving assessment, the user terminal 20 shows an assessment report (second screen) in a form including information prompting to browse the assessment result of the item corresponding to the first item. Then, the user terminal 20 shows information prompting to browse the assessment result of the item corresponding to the first item at an attractive position around the top of the second screen. Thus, it is possible to further reliably prompt the first user to browse the assessment result of the item corresponding to the first item, and it is further reliably possible to recognize the presence of the first button shown in a form to be put side by side with the item.

In the present embodiment, when there is no item corresponding to the first item among the items subjected to driving assessment, the user terminal 20 shows an assessment report (third screen) including only a list of the assessment results of the items. In other words, when there is no item corresponding to the first item among the items subjected to driving assessment, an assessment report that does not include information prompting to browse a specific assessment result or the first button is displayed. Thus, it is possible to reduce burdensome of the first user.

Therefore, according to the present embodiment, it is possible to provide further beneficial information for the first user who uses the driving assessment service.

Modification

In the driving assessment service, even after the first device is attached to the first vehicle 10, the assessment results of the items (assessment report) can be presented to the user. Then, after the first device is attached to the first vehicle 10, the user terminal 20 may present the user an assessment report in which an assessment result just before the first device is attached to the first vehicle 10 and an assessment result after the first device is attached to the first vehicle 10 are put side by side.

Figure 13:
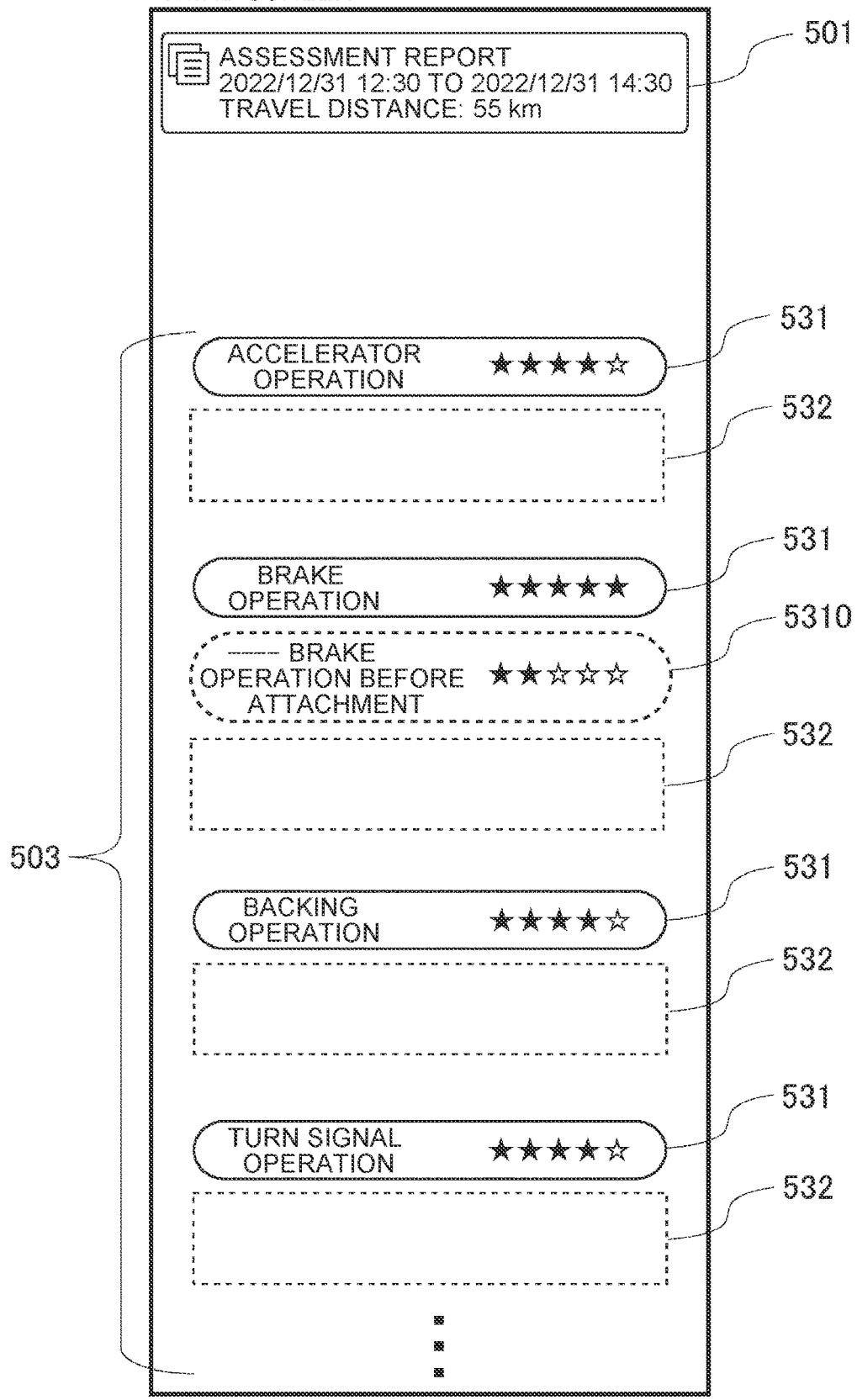
FIG. 13 is a view that shows an example of the second screen according to a modification.

FIG. 13 is a view that shows an example of the third screen according to the modification. The third screen illustrated in FIG. 13 is a display screen for an assessment report after the first device is attached to the first vehicle 10 for assisting in brake operation. In FIG. 13, in a display field (indicated by 503 in FIG. 13) for a list of assessment results of the items, not only the assessment result (indicated by 531 in FIG. 13) on the current brake operation but also an assessment result (indicated by 5310 in FIG. 13) just before the first device is attached to the first vehicle 10 is shown for the item of the brake operation.

When the assessment result of an item other than the brake operation is lower than the reference value, the second screen is shown instead of the third screen. In this case as well, for the item of the brake operation, as in the case of the third screen illustrated in FIG. 13, the assessment result of the current brake operation and the assessment result just before the first device is attached to the first vehicle 10 are shown in a form to be put side by side.

According to the modification, the first user who has attached the first device to the first vehicle 10 is able to compare the assessment result before the first device is attached to the first vehicle 10 with the assessment result after the first device is attached to the first vehicle 10. Thus, it is possible to cause the first user to recognize the effect of attaching the first device.

An assessment report in which an assessment result of the current brake operation and an assessment result just before the first device is attached to the first vehicle 10 are put side by side may be displayed only when an initial driving assessment after the first device is attached is made.

Others

The above-described embodiment is only illustrative, and the disclosure can be implemented with modifications as needed without departing from the purport of the disclosure. The processes and devices described in this disclosure may be freely implemented in combination without any technical contradiction. A process described as the one that is performed by a device may be shared and performed by multiple devices. Alternatively, processes described as the ones that are respectively performed by different devices may be performed by a device. In a computer system, what hardware configuration implements functions may be flexibly changed.

For example, one or some or all of the functions of the user terminal 20 may 20 may be provided in the server 30. In this case, the server 30 may be configured to be capable of implementing a web server for performing interaction with the user terminal 20. In this case, the server 30 may cause the browser of the user terminal 20 to show a web page corresponding to the second screen, a web page corresponding to the third screen, and a web page corresponding to the fourth screen through execution of a web server. With such a configuration, the server 30 may be regarded as the information processing apparatus according to the aspect of the disclosure, and the processor 301 of the server 30 may be regarded as the control unit according to the aspect of the disclosure.

The disclosure may also be implemented as follows. A computer is supplied with a computer program having the functions described in the above-described embodiment, and one or more processors of the computer read out and run the program. Such a computer program may be provided to a computer with a non-transitory computer-readable storage medium connectable to a system bus of the computer or may be provided to a computer via a network. Examples of the non-transitory computer-readable storage medium include a disk or disc of any type, such as a magnetic disk (floppy (registered trademark) disk, a hard disk drive (HDD), or the like), an optical disc (CD-ROM, DVD disc, a Blue-ray disc, or the like), a read only memory (ROM), a random access memory (RAM), an EPROM, an EEPROM, a magnetic card, a flash memory, an optical card, and a medium of any type suitable for storing electronic instructions.

What is claimed is:

1. An information processing apparatus comprising a control unit configured to execute:

acquiring assessment results of a plurality of items on driving operation of a first vehicle, and first information on a first device, the first device being used to assist in driving operation of a first item of which the assessment result is lower than a reference value among the plurality of items, the first device being attachable to the first vehicle; and outputting the assessment results of the plurality of items and the first information in a form in which the assessment result of the first item is associated with the first information.

2. The information processing apparatus according to claim 1, wherein the control unit is configured to output a first button that is a GUI component for causing a first screen on a function of the first device to be output, in a form to be put side by side with the assessment result of the first item.

3. The information processing apparatus according to claim 2, wherein the first screen contains a second button that is a GUI component linked with a site that sells the first device.

4. The information processing apparatus according to claim 1, wherein the control unit is configured to, when the control unit outputs the assessment results of the plurality of items, output information prompting to browse the first item.

5. The information processing apparatus according to claim 1, wherein, when the control unit outputs the assessment results of the plurality of items after the first device is attached to the first vehicle, the control unit is configured to output an assessment result of the first item before the first device is attached and an assessment result of the first item after the first device is attached.

6. The information processing apparatus according to claim 1, wherein the control unit is configured to, when there is no item corresponding to the first item among the plurality of items, output only the assessment results of the plurality of items.

7. An information processing method executed by a computer, the information processing method comprising:
  acquiring assessment results of a plurality of items on driving operation of a first vehicle, and first information on a first device, the first device being used to assist in driving operation of a first item of which the assessment result is lower than a reference value among the plurality of items, the first device being attachable to the first vehicle; and
  outputting the assessment results of the plurality of items and the first information in a form in which the assessment result of the first item is associated with the first information.

8. The information processing method according to claim 7, further comprising outputting, by the computer, a first button that is a GUI component for causing a first screen on a function of the first device to be output, in a form to be put side by side with the assessment result of the first item.

9. The information processing method according to claim 8, wherein the first screen contains a second button that is a GUI component linked with a site that sells the first device.

10. The information processing method according to claim 7, further comprising, when the assessment results of the plurality of items are output, outputting, by the computer, information prompting to browse the first item.

11. The information processing method according to claim 7, further comprising, when the assessment results of the plurality of items are output after the first device is attached to the first vehicle, outputting, by the computer, an assessment result of the first item before the first device is attached and an assessment result of the first item after the first device is attached.

12. The information processing method according to claim 7, further comprising, when there is no item corresponding to the first item among the plurality of items, outputting, by the computer, only the assessment results of the plurality of items.

13. A non-transitory storage medium storing instructions that are executable on one or more processors and that cause the one or more processors to execute functions, the functions comprising:
  acquiring assessment results of a plurality of items on driving operation of a first vehicle, and first information on a first device, the first device being used to assist in driving operation of a first item of which the assessment result is lower than a reference value among the plurality of items, the first device being attachable to the first vehicle; and
  outputting the assessment results of the plurality of items and the first information in a form in which the assessment result of the first item is associated with the first information.

14. The storage medium according to claim 13, wherein the functions further comprise causing the one or more processors to output a first button that is a GUI component for causing a first screen on a function of the first device to be output, in a form to be put side by side with the assessment result of the first item.

15. The storage medium according to claim 14, wherein the first screen contains a second button that is a GUI component linked with a site that sells the first device.

16. The storage medium according to claim 13, wherein the functions further comprise causing the one or more processors to, when the one or more processors output the assessment results of the plurality of items, output information prompting to browse the first item.

17. The storage medium according to claim 13, wherein, when the one or more processors output the assessment results of the plurality of items after the first device is attached to the first vehicle, the functions further comprise causing the one or more processors to output an assessment result of the first item before the first device is attached and an assessment result of the first item after the first device is attached.

18. The storage medium according to claim 13, wherein the functions further comprise causing the one or more processors to, when there is no item corresponding to the first item among the plurality of items, output only the assessment results of the plurality of items.

* * * * *